Oct. 15, 1957   R. A. SHEPHERD   2,809,686
BARREL NUT WITH SPRING RETAINER MEMBER
Filed Aug. 16, 1952   2 Sheets-Sheet 1
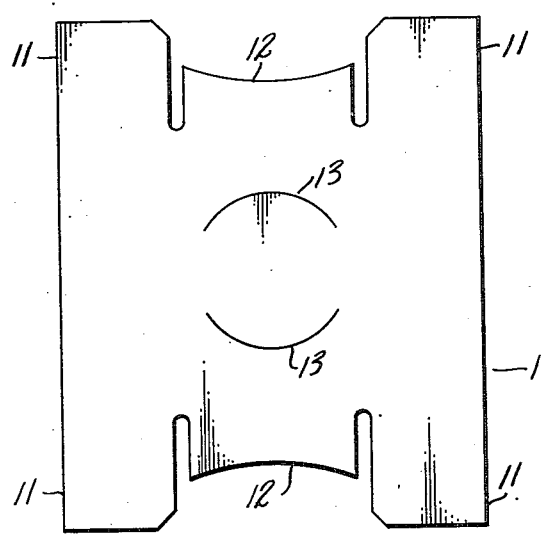
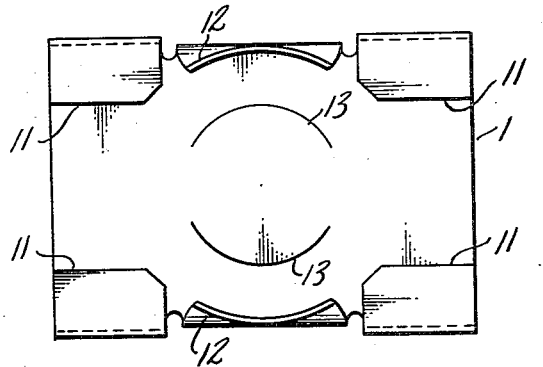
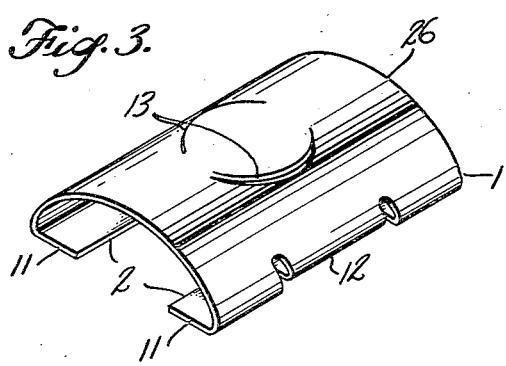
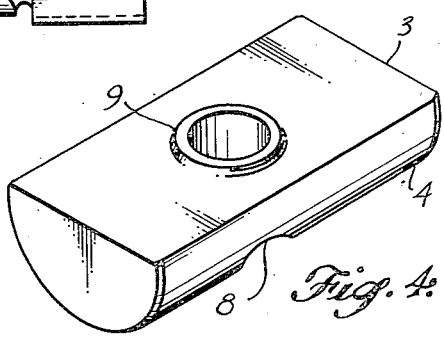
INVENTOR.
RAY A. SHEPHERD
BY William B. Walter
AGENT INVENTOR.
RAY A. SHEPHERD
BY William B. Walter
AGENT

United States Patent Office 2,809,686
Patented Oct. 15, 1957

2,809,686

BARREL NUT WITH SPRING RETAINER MEMBER

Ray A. Shepherd, Seattle, Wash., assignor to Boeing Airplane Company, Seattle, Wash., a corporation of Delaware Application August 16, 1952, Serial No. 304,724

3 Claims. (Cl. 151—41.75)

This invention relates to threaded fasteners generally and particularly to means for retaining semicylindrical nuts in a cylindrical hole bored transversely to the screw axis so that the nut is in axial alignment with the screw. The semicylindrical nut is ordinarily termed a barrel nut and shall be referred to as such throughout this specification.

A barrel nut and screw or bolt is a very useful means of fastening to a thick structural member. The barrel nut can, and in most instances does, contain a thread-locking means to prevent loosening of the screw and nut upon application of vibratory loads.

In preparing the structural member for installation of the barrel nut it is only necessary to drill a cylindrical hole into that member for the screw and a second hole on an axis perpendicular to and intersecting the first hole, to accommodate the barrel nut.

In conventional usage of barrel nuts the barrel nut is slid into the hole transverse to the screw axis by use of a screw driver or similar tool and a second screw driver is inserted through the extension of the screw hole to contact the nut, and by manipulating the two screw drivers it is possible to place the barrel nut in position to receive the screw to hold it in that position while the screw is inserted and engaged with the threads of the nut. When the end of the screw-hold opposite to that in which the screw is inserted is not available, because the hole has not been drilled completely through the structure or because of interference of a structure, mechanics have found it very difficult to align the barrel nut with the screw thread.

Use of the barrel nut and screw as a blind fastener where access can be had only to the side of the structure into which the screw is inserted is not possible without using this invention.

This invention comprises a spring which in effect fills up the semicylindrical void opposite to the barrel nut in the cylindrical hole, when inserted with the barrel nut into the hole to the point of alignment of the barrel nut with the screw hole. At this point my invention will spring outwardly to engage itself with the extension of the screw-hole, thus locking the barrel nut in proper alignment with the screw-hole for engagement of the screw.

This invention is a simple, inexpensive expedient for obtaining an easily assembly barrel nut and nut keeper, whereby the barrel nut can act as a blind fastener.

In the accompanying drawings, Figure 1 is a view of the preferred type of barrel nut keeper showing the face which in use contacts the barrel nut.

Figure 2 is a flat pattern of this barrel nut keeper as made from sheet metal.

Figure 3 is a perspective view of the keeper.

Figure 4 is a perspective view of a barrel nut with a well-known type of self-locking arrangement.

Figures 5, 6:
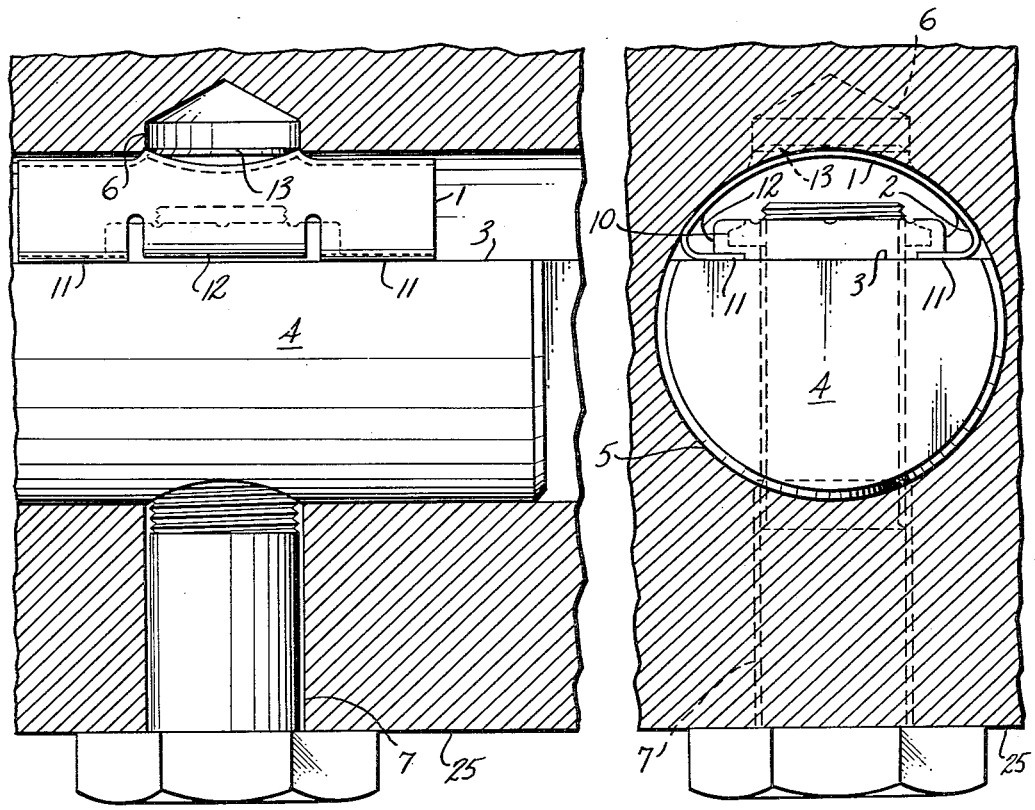
Figure 5 is an end view of the barrel nut, barrel nut keeper and bolt as installed.
Figure 6 is a side view partly in section of the installation shown in Figure 5.

My invention as disclosed here is for use with a barrel nut 4 substantially as shown in Figure 4. This nut 4 is semi-cylindrical in shape, the cross-section being a major segment of a circle. The threaded bore 8 is centrally located on the length of the nut 4 perpendicular to the longitudinally disposed flat face 3 of the nut 4. On this flat face 3 is a raised boss 9 containing a nylon ring 10 which upon being deformed by the bolt threads acts to restrain the bolt from rotation.

Referring now to the drawings, Figures 1, 5 and 6 show the preferred form of barrel nut keeper 1 which has been formed from the sheet metal pattern shown in Figure 2.

This keeper 1 is a resilient arch spring, which is so constructed that the base 2 will engage and press against the flat longitudinal face 3 of the barrel nut 4 and the crown 26 will not only press against the internal surface of the hole 5 into which the nut 4 and keeper 1 are inserted but will also extend itself partially into the terminal end 6 of the bolt hole 7.

On its base, the keeper 1 has four inwardly bent feet 11, each chamfered on its inside corner, and two centrally located feet 12 bent in arcuate form, the arcuate faces of which combine with the chamfered corners of feet 11 to match the outside walls of the thread-locking boss 9 of the barrel nut.

On its rounded surface, the keeper 1, has two rounded ears 13 which combine to form a circular flat spring that, upon installation of the barrel nut 4 and keeper 1 into the transverse hole 5 pops into the terminal end 6 of the bolt hole 7, thus aligning the threaded bore 8 of the barrel nut 4 with the bolt hole 7 and holding it in that aligned position.

Figure 7:
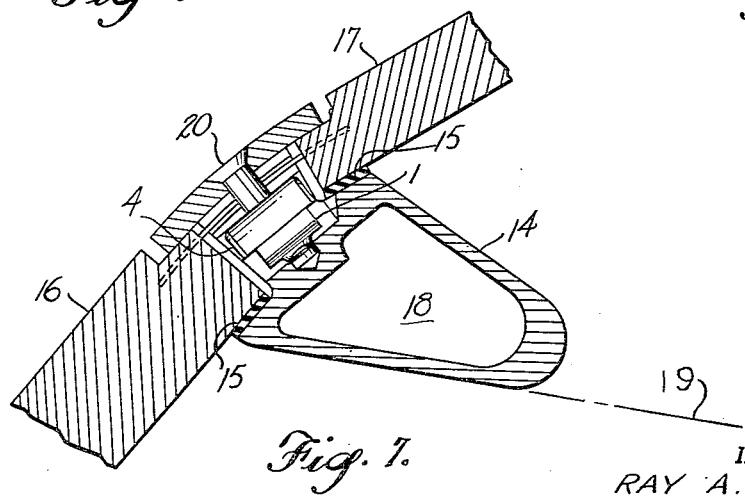
Figure 7 is a sectional view of windshield mounting for aircraft in which the barrel nut and barrel nut keeper is used to good advantage.

In Figure 7 I have shown an aircraft windshield construction which by using my barrel nut keeper 1 obtains a particularly desirable narrow frame member for adjacent windows. In aircraft construction, windshield frames must have sufficient strength to withstand internal cabin pressures in excess of the surrounding atmospheric pressures and must also, in most instances, carry the loads of a continuous monocoque structure. In order to obtain a strong windshield structure it is usually necessary therefore to break up a large transparent area with many panes. To allow maximum visibility through such a window it is most desirable and necessary to keep the window frame members as narrow as possible. In order to obtain a windshield frame of sound structure, light weight and of such form to obstruct little of the pilot's vision, the frame member 14 as shown in Figure 7 having an odd configuration has resulted. This frame member does not present an external flat surface at the desired perpendicular angle to the screw axis. The window frame member 14 is a welded steel section having rabbets 15 on each side to support two window glasses 16 and 17 and a hollow interior portion 18. The angle of sight for the pilot is indicated by centerline 19.

With the construction shown, all of the barrel nuts 4 surrounding the windshield panes must be in place before the panes are set since there is no access to the nuts once the panes are in place. My barrel nut keeper 1 is thus used to full advantage in this instance since each of the barrel nuts 4 can be easily inserted in the frame members with its keeper 1 and the keepers will retain the nuts 4 in axial alignment with the screw holes 7 until the screws 20 are engaged with the nuts 4.

I claim as my invention:

1. The combination with a body having two intersecting cylindrical bores, of a barrel nut having a raised boss on its flat side, a barrel nut retainer having a D-shaped cross-section and contact surfaces on its flat face, said flat faces of said barrel nut and retainer abutting, with said contact surfaces of the retainer interfitted with said raised boss of the nut to join nut and retainer, said joined nut and retainer located in one of said intersecting bores, said retainer having raised surfaces on its rounded face opposite said contact surfaces and aligned with the nut bore, said raised surfaces contacting the walls of the other of said intersecting bores to locate the joined retainer and nut at the intersection of said bores.

2. In a nut assembly, the combination of a support member having a cylindrical nut receiving bore therein, a bolt receiving opening extending substantially normal to and intersecting the axis of the nut receiving bore, and a recess in the support member, and a nut assembly in the nut receiving bore, said nut assembly having a threaded bore aligned with the bolt receiving opening, said nut assembly having a cylindrical bottom surface surrounding said threaded bore and supported on the surface of said nut receiving bore, an upper surface facing said recess and spaced from the surface of said nut receiving bore, and a resilient nut retainer assembled with the nut assembly in the nut receiving bore, said retainer having means non-rotatably mounting said retainer on said nut assembly, said retainer being under compression between said nut assembly and the top of said nut receiving bore, said retainer having a projection engaging said recess whereby the nut assembly bore is maintained aligned with the bolt opening and the nut assembly is retained in the nut receiving bore.

3. A keeper device for locating and maintaining a barrel nut in bolt engageable position within a cylindrical nut-receiving bore which intersects a bolt-receiving bore between the latter's ends, such barrel nut being generally of elongated cylindrical-segmental form having a flat side and a threaded bore extending transversely therethrough perpendicular to such side, with a boss on the flat side surrounding the bore, said keeper device formed from a resilient strip, a portion of the said strip being arched between opposite side edges thereof to form a cylindrical portion substantially complemental to the barrel nut cylindrical segment, and the remaining opposite sides of the said strip being turned inwardly toward each other to form the base portion that seats on flat side of the barrel nut with the respective cylindrical segmental portions of the keeper device and barrel nut substantially coaxial, the said remaining opposite turned strip sides having edges formed and located to contact the sides of the barrel nut boss thereby preventing relative shifting of the keeper device lengthwise of the barrel nut, and a pair of deflectable ear elements formed at the center of the arch of the keeper strip in alignment with the nut bore and projecting oppositely from the longitudinal center thereof transversely of the keeper device in substantially a common plane parallel to the keeper device base portion, said ear elements having projecting edges of convex form shaped and relatively located to resiliently fit inside the bolt-receiving bore, thereby to maintain the assembled barrel nut and keeper device in the bolt-engageable position of the barrel nut in the nut-receiving bore.

References Cited in the file of this patent

UNITED STATES PATENTS

| | | |
|---|---|---|
| 1,671,757 | Allen | May 29, 1928 |
| 2,144,553 | Simmonds | Jan. 17, 1939 |
| 2,188,135 | Lee | Jan. 23, 1940 |
| 2,304,481 | Shannon | Dec. 8, 1942 |
| 2,326,285 | Burke | Aug. 10, 1943 |
| 2,336,319 | Tinnerman | Dec. 7, 1943 |
| 2,496,094 | Johnson | Jan. 31, 1950 |
| 2,596,056 | Tinnerman | May 6, 1952 |
| 2,703,663 | Connett | Mar. 8, 1955 |